US007853620B2

(12) United States Patent
Paila et al.

(10) Patent No.: US 7,853,620 B2
(45) Date of Patent: Dec. 14, 2010

(54) DATACAST FILE TRANSMISSION WITH META-DATA RETENTION

(75) Inventors: Toni Paila, Degerby (FI); Juha-Pekka Luoma, Tampere (FI); Esa Jalonen, Espoo (FI)

(73) Assignee: Nokia Corporation, Espoo (FI)

( * ) Notice: Subject to any disclaimer, the term of this patent is extended or adjusted under 35 U.S.C. 154(b) by 306 days.

(21) Appl. No.: 11/743,840

(22) Filed: May 3, 2007

(65) Prior Publication Data

US 2007/0208774 A1 Sep. 6, 2007

Related U.S. Application Data

(62) Division of application No. 10/356,270, filed on Jan. 31, 2003, now Pat. No. 7,231,404.

(51) Int. Cl.
*G06F 7/00* (2006.01)
*G06F 17/30* (2006.01)
(52) U.S. Cl. .................. 707/802; 707/781; 707/955; 709/205
(58) Field of Classification Search ........................ None
See application file for complete search history.

(56) References Cited

U.S. PATENT DOCUMENTS

| | | | |
|---|---|---|---|
| 5,128,776 A | 7/1992 | Scorse et al. | |
| 5,701,602 A | 12/1997 | Shimoda | |
| 5,717,925 A | 2/1998 | Harper et al. | |
| 5,745,694 A | 4/1998 | Egawa et al. | |
| 5,830,068 A | 11/1998 | Brenner et al. | |
| 5,845,267 A | 12/1998 | Ronen | |
| 5,935,206 A | 8/1999 | Dixon et al. | |
| 5,946,326 A | 8/1999 | Rinne | |
| 6,052,715 A | 4/2000 | Fukui et al. | |
| 6,115,486 A | 9/2000 | Cantoni | |
| 6,169,843 B1 | 1/2001 | Lenihan et al. | |
| 6,195,680 B1 | 2/2001 | Goldszmidt et al. | |
| 6,226,618 B1 | 5/2001 | Downs et al. | |
| 6,240,416 B1 | 5/2001 | Immon et al. | |
| 6,373,950 B1 | 4/2002 | Rowney | |
| 6,393,456 B1 * | 5/2002 | Ambler et al. | 709/200 |

(Continued)

FOREIGN PATENT DOCUMENTS

AU 199940190 A1 3/2000

(Continued)

OTHER PUBLICATIONS

Luby, et. al, Internet Engineering Taskforce, Request for Comments: 3450, "Asynchronous Layered Coding (ALC) Protocol Instantiation", 29 pages, Dec. 2002.

(Continued)

*Primary Examiner*—Khanh B Pham
*Assistant Examiner*—Azam Cheema
(74) *Attorney, Agent, or Firm*—Locke Lord Bissell & Liddell LLP

(57) ABSTRACT

The present invention discloses a system and method for transmitting files over a datacast network while maintaining meta-data associated with the files. The system employs devices programmed to operate according to a protocol that preserves a file's properties such as, for example, its name, type, length, and hierarchical relationship, i.e. the file's absolute or relative location.

6 Claims, 5 Drawing Sheets

U.S. PATENT DOCUMENTS

| | | | |
|---|---|---|---|
| 6,393,562 B1 | 5/2002 | Maillard | |
| 6,502,139 B1 | 12/2002 | Birk et al. | |
| 6,925,595 B1 * | 8/2005 | Whitledge et al. | 715/234 |
| 7,028,071 B1 | 4/2006 | Slik | |
| 7,058,763 B2 * | 6/2006 | Gabber et al. | 711/118 |
| 2001/0025256 A1 | 9/2001 | Oliphant et al. | |
| 2001/0025349 A1 | 9/2001 | Sharood et al. | |
| 2002/0015042 A1 | 2/2002 | Robotham et al. | |
| 2002/0015496 A1 | 2/2002 | Weaver et al. | |
| 2002/0016972 A1 | 2/2002 | Ogawa et al. | |
| 2002/0023270 A1 | 2/2002 | Thomas et al. | |
| 2002/0048275 A1 * | 4/2002 | Atwater et al. | 370/409 |
| 2002/0131387 A1 | 9/2002 | Pitcher et al. | |
| 2003/0002862 A1 | 1/2003 | Rodriguez et al. | |
| 2003/0009380 A1 | 1/2003 | Suzuki et al. | |
| 2003/0050058 A1 | 3/2003 | Walsh et al. | |
| 2003/0115219 A1 * | 6/2003 | Chadwick | 707/200 |
| 2003/0225835 A1 * | 12/2003 | Klien et al. | 709/205 |

FOREIGN PATENT DOCUMENTS

| | | |
|---|---|---|
| DE | 195 09 709 A1 | 9/1995 |
| EP | 0 680 185 A2 | 11/1995 |
| EP | 0 710 017 A2 | 5/1996 |
| EP | 0 745 412 A1 | 12/1996 |
| EP | 0 745 948 A2 | 12/1996 |
| EP | 0 752 787 A1 | 1/1997 |
| EP | 0 802 677 A1 | 10/1997 |
| EP | 0 858 225 A1 | 8/1998 |
| EP | 0 866 614 A1 | 9/1998 |
| EP | 0 873 772 A1 | 10/1998 |
| EP | 0 920 891 A1 | 6/1999 |
| EP | 0 921 657 A1 | 6/1999 |
| EP | 0 998 145 A1 | 5/2000 |
| EP | 1 005 885 A1 | 6/2000 |
| EP | 1 026 707 A1 | 8/2000 |
| EP | 1 026 886 A2 | 8/2000 |
| EP | 1 026 892 A1 | 8/2000 |
| EP | 1 026 896 A1 | 8/2000 |
| EP | 1 028 589 A1 | 8/2000 |
| EP | 1 037 461 A2 | 9/2000 |
| EP | 1 037 462 A2 | 9/2000 |
| EP | 1 041 791 A1 | 10/2000 |
| EP | 1 043 911 A2 | 10/2000 |
| EP | 1 043 924 A2 | 10/2000 |
| EP | 1 045 339 A1 | 10/2000 |
| EP | 1 045 582 A1 | 10/2000 |
| EP | 1 045 584 A2 | 10/2000 |
| EP | 1 049 276 A1 | 11/2000 |
| EP | 1 050 328 A1 | 11/2000 |
| EP | 1 052 553 A2 | 11/2000 |
| EP | 1 052 854 A1 | 11/2000 |
| EP | 1 056 279 A1 | 11/2000 |
| EP | 1 059 729 A1 | 12/2000 |
| GB | 2 343 809 A | 5/2000 |
| NZ | 500442 A | 3/2000 |
| WO | WO 95/01058 | 1/1995 |
| WO | WO 95/13681 | 5/1995 |
| WO | WO 96/34486 | 10/1996 |
| WO | WO 97/23052 | 6/1997 |
| WO | WO 98/57718 | 12/1998 |
| WO | WO 99/14775 | 3/1999 |
| WO | WO 99/14874 | 3/1999 |
| WO | WO 99/22512 | 5/1999 |
| WO | WO 99/33076 | 7/1999 |
| WO | WO 99/37048 | 7/1999 |
| WO | WO 99/49663 | 9/1999 |
| WO | WO 99/51030 | 10/1999 |
| WO | WO 00/03482 | 1/2000 |
| WO | WO 00/07361 | 2/2000 |
| WO | WO 00/09948 | 2/2000 |
| WO | WO 00/24195 | 4/2000 |
| WO | WO 00/26813 | 5/2000 |
| WO | WO 00/38430 | 6/2000 |
| WO | WO 00/51057 | 8/2000 |
| WO | WO 00/64177 | 10/2000 |
| WO | WO 00/79831 A1 | 12/2000 |
| WO | WO 01/22632 A1 | 3/2001 |

OTHER PUBLICATIONS

Luby, et. al, Internet Engineering Taskforce, Request for Comments: 3451, "Layered Coding Transport (LCT) Building Block", 25 pages, Dec. 2002.

Rocca, "The MCL Library: An Open Source Implementation of the ALC/LCT Protocols for Scalable Feedback-Free Multicast Distribution", 2 pages, 1999/2002.

Blackketter, Internet Engineering Taskforce, Internet-Draft, "The Unidirectional Hypertext Transfer Protocol draft-blackketter-uhttp-00.txt", 17 pages, Feb. 11, 2000.

Handley, et. al, Internet Engineering Taskforce, Request for Comments: 2327, "SDP: Session Description Protocol", 36 pages, Apr. 1998.

* cited by examiner

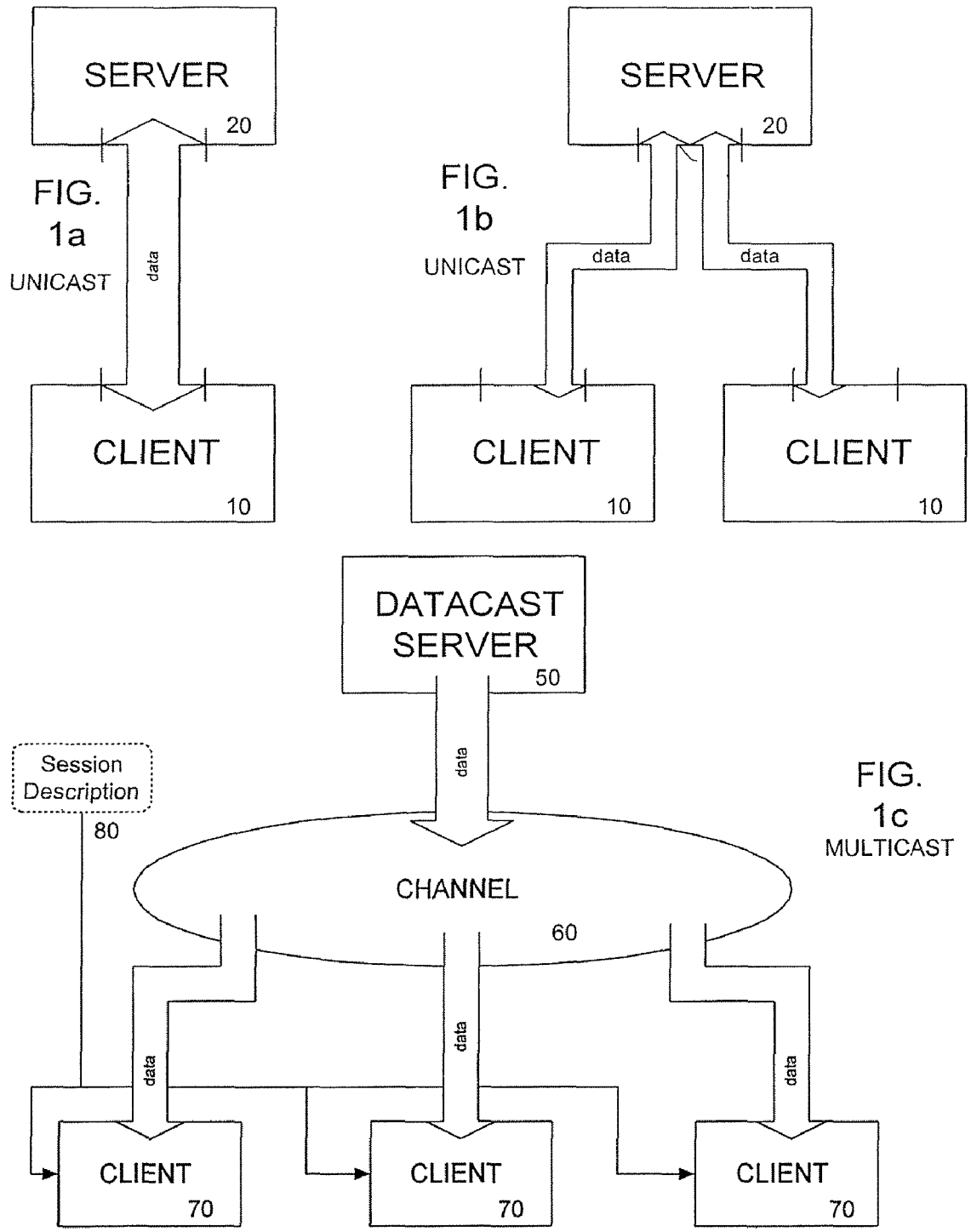

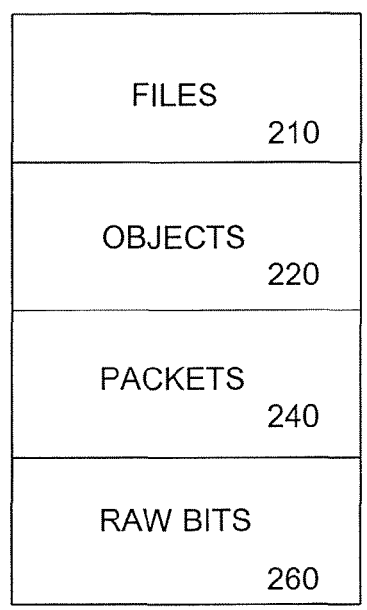
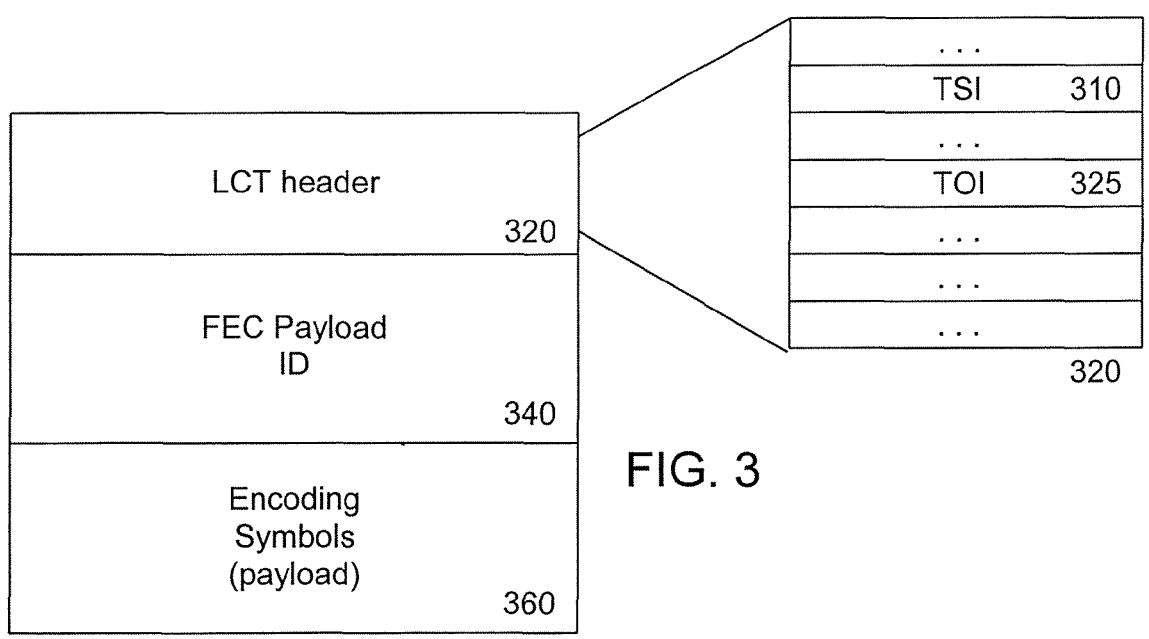

MULTIPART OBJECT 600

MIME-Version: 1.0
Content-Length: 42000
Content-Type: multipart-related
boundry=example4321      610

--example4321      620
content location:
nokia.com/data/show1.mpg
content type:
video/mpeg4
content-length:
38000
<<show1.mpg data>>      630
--example4321      620
content location:
nokia.com/data/review/show1.html
content type:
text/html
content-length:
4000
<<show1.html data>>      635

FIG. 6

DATACAST FILE TRANSMISSION WITH META-DATA RETENTION

This application is a divisional of co-pending application Ser. No. 10/356,270 filed Jan. 31, 2003, which is incorporated herein by reference.

FIELD OF THE INVENTION

This invention relates generally to digital content distribution over a network. More specifically, the present invention provides a system and method for the broadcast of data in a packet-based network.

BACKGROUND OF THE INVENTION

Data network communication is typically characterized by point-to-point, i.e. unicast, connections. As shown in FIG. 1a, typical unicast communication involves two-way communications between a client device 10 that requests information and a server device 20 that provides the requested data objects. To initiate a data transmission the client sends a request identifying the client's address and the requested data object. Clearly, the request must also contain the server's address to reach its intended destination. Upon receipt of the request the server will collect the requested data objects and deliver them to the client's address identified in the request. This system has attained a high level of success. It is not optimal, however, for every type of data delivery.

One key disadvantage of a typical unicast system is that it is inefficient for the delivery of data to a large group of clients. FIG. 1b clearly shows the reason for this inefficiency. If multiple clients 10 attempt to simultaneously access a particular data object, the server's 20 resources can be quickly overwhelmed. With two users trying to access the data object, as shown in the figure, the server must split its available bandwidth and computational resources to receive and process the various data requests. The bandwidth, however, is used to send out what are effectively identical copies of requested information. The server must also monitor the quality of the data object delivery and respond to requests for the retransmission of packets that do not arrive at a particular client's device. The inefficiency of this design does not present a problem if only two users attempt to access a data object. It is apparent, however, that as the number of simultaneous users accessing a server grows it will eventually push the server past its operational capacity.

These inefficiencies can be avoided by providing a datacast, or filecast, system to broadcast files to a large number of client devices. As shown in FIG. 1c, a datacast delivery model is very efficient for transmitting a data object, or group of objects, to a large number of users. As shown, the basic participants of a datacast operation are the Datacast Server 50, the Channel 60, which is part of the network structure, and client devices 70. In this particular example only three clients are shown, but datacast is intended to support a very large number of clients. Of course, the model would still work with just one client in which case it would represent a variation of unicast.

Before a datacast begins client devices must receive a session description 80, which is simply data used to inform the clients of the datacast's content, location, and time. This is somewhat analogous to using a T.V. guide to find the time and channel a particular show is on. The datacast server will begin to transmit the data object into the designated channel at the appointed time as specified in the session description. Client devices can then "tune-in" to the channel and receive the desired information.

Datacast is more efficient for the transmission of data to a large group of clients for a few reasons. First, datacast can operate with little, or no, client communication to the server. A datacast server, therefore, does not have to address incoming requests. Second, the data is sent out to all users simultaneously. This avoids wasting bandwidth to send a copy of the same file to each requesting client. These advantages are especially useful in a mobile communications environment because mobile devices may have a lack of power and limited memory.

SUMMARY OF THE INVENTION

Simple datacasting, however, does not provide sufficient information for the delivery of a complete file transmission. It would, therefore, be useful to identify meta-data pertaining to the transmitted files such as, for example, their names, types, lengths, and hierarchical relationships, i.e. the files' absolute or relative location. Thus, a technical advance is achieved in the art by providing systems, methods, and computer program products for enabling the datacast of files with the retention of their associated meta-data.

An exemplary embodiment of the present invention provides a device for receiving datacast information and recreating files having the appropriate associated property information. The device provides hardware and software capable of receiving packet data from a datacast session; grouping the received packets into separate objects based on a transmission object identifier; extracting meta-data from the file description table pertaining to the other objects; and using the meta-data from the file description table to control the reception of data packets and to store the selected other objects as files having the appropriate properties.

Another exemplary embodiment of the present invention provides a device for datacast transmission of files while retaining their associated properties. The device provides hardware and software capable of reviewing files to be datacast and determining their associated file properties; creating a file description table associating each file with its properties and a transmission object identifier; dividing the files into packets with headers identifying the files by transmission object identifier; dividing the file description table into a packets with headers identifying a special reserved transmission object identifier; and transmitting the packets into a datacast channel.

Another exemplary embodiment of the present invention provides a device for receiving datacast information and recreating files having the appropriate associated property information. The device provides hardware and software capable of receiving packet data from a datacast session; grouping the packets into a MIME-multipart file; parsing the MIME-multipart file to extract the enclosed data objects; using header data in the MIME-multipart file to save the enclosed data objects as files having the appropriate properties.

Another exemplary embodiment of the present invention provides a device for transmitting datacast information while retaining their associated properties. The device provides hardware and software capable of reviewing files to be datacast and determining their associated file properties; creating a MIME-multipart file containing the files and including MIME headers indicating the associated properties of the enclosed files; dividing the MIME-multipart file into packets and distributing them over a datacast channel.

Other and further aspects of the invention will become apparent during the course of the description and by reference to the attached drawings.

BRIEF DESCRIPTION OF THE DRAWINGS

FIG. 1a is a block diagram showing an overview of a simple unicast data transmission system.

FIG. 1b is a block diagram showing an overview of a unicast data transmission system as more clients are added.

FIG. 1c is a block diagram showing an overview of a multicast data transmission system.

FIG. 2 is a block diagram representing the hierarchy of actions required to transmit a file.

FIG. 3 is a block diagram representing an ALC packet.

FIG. 6 is a block diagram demonstrating a multipart object in accordance with an exemplary embodiment of the present invention.

DETAILED DESCRIPTION OF THE INVENTION

Figure 4:
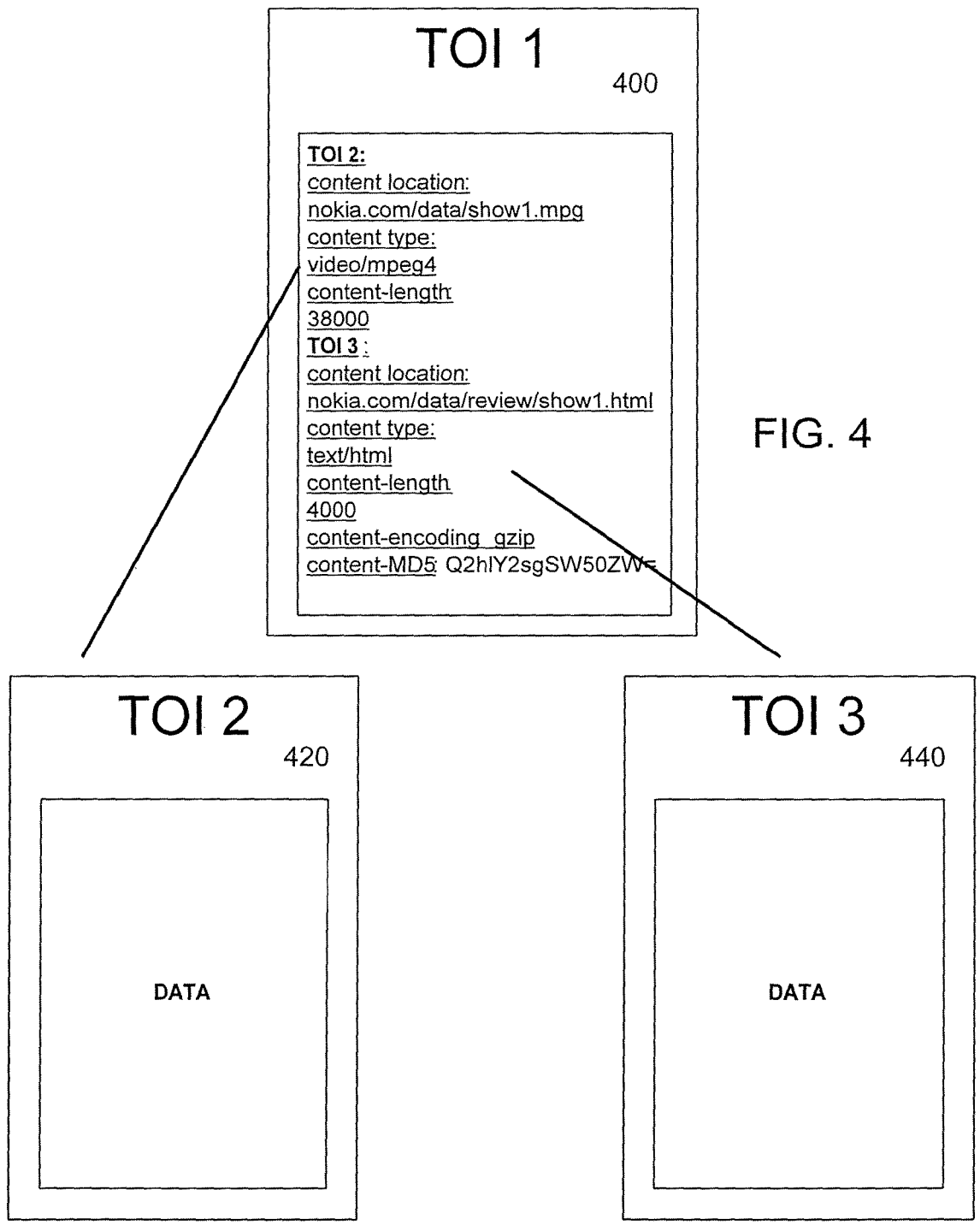
FIG. 4 is a block diagram showing the transmission objects including their contents and their TOIs for an exemplary embodiment of the present invention.

The present invention teaches an advance in the art by providing a system and method for datacasting files while maintaining the transmitted files' properties, such as their names, types, sizes and directory structure, i.e. meta-data. The present invention thereby enables users receiving datacast files to completely, and accurately, reconstruct transmitted files, including their absolute or relative locations.

A datacast in accordance with the present invention follows the same general structure outlined in FIG. 1c. Datacast Server 50 can be embodied in hardware by a processing environment, e.g. CPU, volatile memory, non-volatile memory, and network interface, capable of running the software routines required to practice the invention as described below. Similarly, the client device 70 is also embodied by a processing environment and software as described below. Any number of devices could be programmed to embody a client or server device, for example personal computers, mainframes, mobile phones, personal digital assistants, etc. The client device may comprise a handheld cellular transceiver and an integrated broadcast receiver.

The channel 60 represents the network used to transmit the information from the server to the client. This could be the Internet, a LAN, a WAN, a cellular network such as GSM, GPRS, UMTS, CDMA2000, or a digital broadcast system such as DVB-T/S/C, DAB, ISDB-T, ATSC, etc. Furthermore, the channel could be embodied in a one-way transmission medium such as radio or satellite. A combination these various networks could also be used.

The Session Description 80 represents data conveyed to the clients 70 prior to joining the datacast. The Session Description informs the clients of the datacast session's existence, location and time. Formally, the session description could be embodied as a text file containing, for example, the IP address of the transmission channel, the UDP port the data will be sent to, the sessions start and end time, and a session identifier to distinguish the described session from others that might be transmitted over the identified channel. The session description should also contain information describing the content of the datacast. The session description may also be conveyed using Session Description Protocol (SDP) as described in Internet Engineering Taskforce, Request For Comments: 2327, "SDP: Session Description Protocol", which is hereby incorporated by reference.

As with any network transmission method, datacast networking requires protocols implemented in software, or hardware, running on client and server devices. As shown in FIG. 2, the various software/hardware elements required to practice a protocol are typically organized in a stack 200 with abstract user, or application, accessible actions at the top and detailed operative actions at the bottom.

The operations required to transmit a file begin at the top of the stack 200 with an application directly, or under user command, initiating a file 210 send process. The software identifies the files to be transmitted and their destination. It passes this information to lower level object software 220 that prepares the objects for transport. Next, packet operation software 240 breaks the objects into packets of data with headers to indicate the destination and format of the transmitted objects. Finally, the packets are sent to lower level raw bit operation software/hardware 260 that actually transmits the bits of the packets.

The operations required to receive a file begin at the bottom of the stack and work their way up. Raw bit operation software/hardware 260 manages the receipt of the individual bits. These bits are passed to software that organizes them into packets 240. The packets are passed further along to software that interprets packets and organizes them into objects 220. Finally, the objects are used to create files 210 accessible to users and other applications, for example, a media player.

The present invention provides a system and method for defining the structure of the protocol at the packet, object and file levels, such that datacast files may easily be arranged and reconstructed into usable files with their appropriate properties, i.e. meta-data.

An exemplary embodiment of the present invention is described using the Asynchronous Layered Coding (ALC) protocol as described in the Internet Engineering Taskforce, Request For Comments: 3450, "Asynchronous Layered Coding (ALC) Protocol Instantiation", and the Internet Engineering Taskforce, Request For Comments: 3451, "Layered Coding Transport (LCT) Building Block", which are hereby incorporated by reference. Of course, the teachings of the present invention could easily be adapted to other datacast protocols.

ALC describes the general layout of a transport object delivery packet, but leaves higher level application of the protocol to the specific implementation. As shown in FIG. 3, an ALC packet consists of three main parts. The first field of the packet is the Layered Coding Transport (LCT) header 320, which contains the core descriptive elements of the packet. Next is the Forward Error Correction (FEC) Payload ID 340, which, as the name implies, is used for error correction of the transmitted data. Finally, the last element of the packet is the Encoding Symbols 360, which represent the actual transmitted data of the packet. The ALC packet could be further encapsulated using, for example, the User Datagram Protocol (UDP).

As is also shown in FIG. 3, the LCT header 320 is further broken down into additional subparts. One of the fields carried in the ALC header is the Transmission Session ID (TSI) 310, which allows the receiver of the session to uniquely identify received packets as part of the session. Given a source IP address and a destination IP address there may be several filecast sessions in parallel, each identified with a unique TSI. The Transport Object Identifier (TOI) 325 is of particular interest to the present invention. It is used to differentiate between multiple files delivered in a single session identified by the TSI. The TOI allows the multiplexing and parallel transmission of multiple objects in a single session. This ability is important because it is used by the recipient to determine the particular object a packet belongs to. Each object has its own TOI value and each packet that makes up part of that object will have that value in its TOI field of the LCT header.

In a first exemplary implementation of the present invention, a particular datacast object, namely a file delivery table (FDT), is included in the transmission session to identify the other objects and define their associated meta-data. As shown in FIG. 4, a protocol wide TOI value is reserved and used to identify the FDT. For example, the TOI value "1" could be reserved to indicate the FDT. Thereafter data carried in, TOI 1 400 would describe the meta-data pertaining to the other objects delivered in the session, such as in the present example TOI 2 420 and TOI 3 440.

As noted above, the file meta-data carried in the FDT can define any relevant attributes of the transmitted files. The example FDT shown in FIG. 4 identifies the transmitted files' location, e.g. nokia.com/data/show1.mpg. This represents the file's actual location, but this field could also be used to define the file's intended relative location on the client machine, e.g. /media/video/nokia/show1.mpg. The file's name is also carried in this field, e.g. show1.mpg. The FDT goes on to list the file's content type, e.g. video/mpeg4. Although this is somewhat redundant because the file extension on the file name could be used to derive this information. Finally, the FDT of the example describes the file's size. Other examples of information that could be given in the FDT include, content encoding, e.g. gzip, security properties and authentication information, e.g. the result of a MD5 hash function performed on the file.

This meta-data is not only useful for setting a file's properties but it can also be used by other operations. For example, the client device can examine the file's size as listed in the FDT and may refuse to receive and/or save any packets of the file if its size is larger than the device's available non-volatile memory. Similarly, the client device can refuse to open the delivered file if its hash value does not match the indicated hash. This function can avoid the distribution of viruses, and other malicious code, through spoofing of the datacast channel. The meta-data may, also, be used by the receiver to refuse the receipt, or warn the user, if incoming files are encoded with an encoding the receiver does not recognize. An exemplary embodiment of the File Delivery Table (FDT) provides mapping between a TOI value and the file properties of the object it is associated with. Each file delivery session may have a FDT that is local to the given session. The FDT provides mapping for every TOI appearing within the session. The TOIs that are not resolved by the FDT are not considered a part of file delivery session. The FDT is carried within the file delivery session and uses the reserved TOI value '1'. The FDT may appear in any part of the file delivery session and even multiplexed with other objects. In one embodiment of the invention the FDT is delivered prior to the files that are described in the table.

The following rules define the dynamics of the File Delivery Table:
  Within a file delivery session, at least one FDT has to be delivered.
  FDT may appear in any part of the file delivery session and even multiplexed with other objects.
  Multiple FDTs can be carried in a file delivery session. In this case the FDTs are not multiplexed packet-wise and delivery of a previous FDT must end before the delivery of the next FDT starts.
  In a preferred embodiment of the invention the FDT is delivered prior to the files that are described in the table.
  Each FDT uses the reserved TOI value of '1'.
  Each FDT is complete and thus completely overwrites the information carried in the previous FDT.
  Each FDT has a version number 'Version:' that is contained in the version field of the FDT. For each file delivery session, version numbering starts from '0' and increased for each new FDT.
  Within a file delivery session, any TOI is not defined more than once. An example: FDT version 0 defines TOI of value '3'. Now, subsequent FDTs can either keep TOI '3' unmodified on the table, or drop it. The latter case is interpreted as implicit deletion of the TOI.
  FDT contains expiry time stamp 'Expires:' that defines until what time (NTC) the FDT is valid.
  FDT contains the size of the FDT itself 'Content-Length:' (in bytes).

Example of File Delivery Table

```
--beginning of file--
Version: 0
Content-Length: 200
Expires: 2873404696
2:
Content-Location: www.example.com/clips/movie1.mp4
Content-Type: video/MPEG4
Content-Length: 380000
3:
Content-Location: www.example.com/menu/movies.html
Content-Type: text/html
Content-Length: 6100
Content-Encoding: gzip
Content-MD5: Q2h1Y2sgSW50ZWdyaXR5IQ==
--end of file--
```

Figure 5:
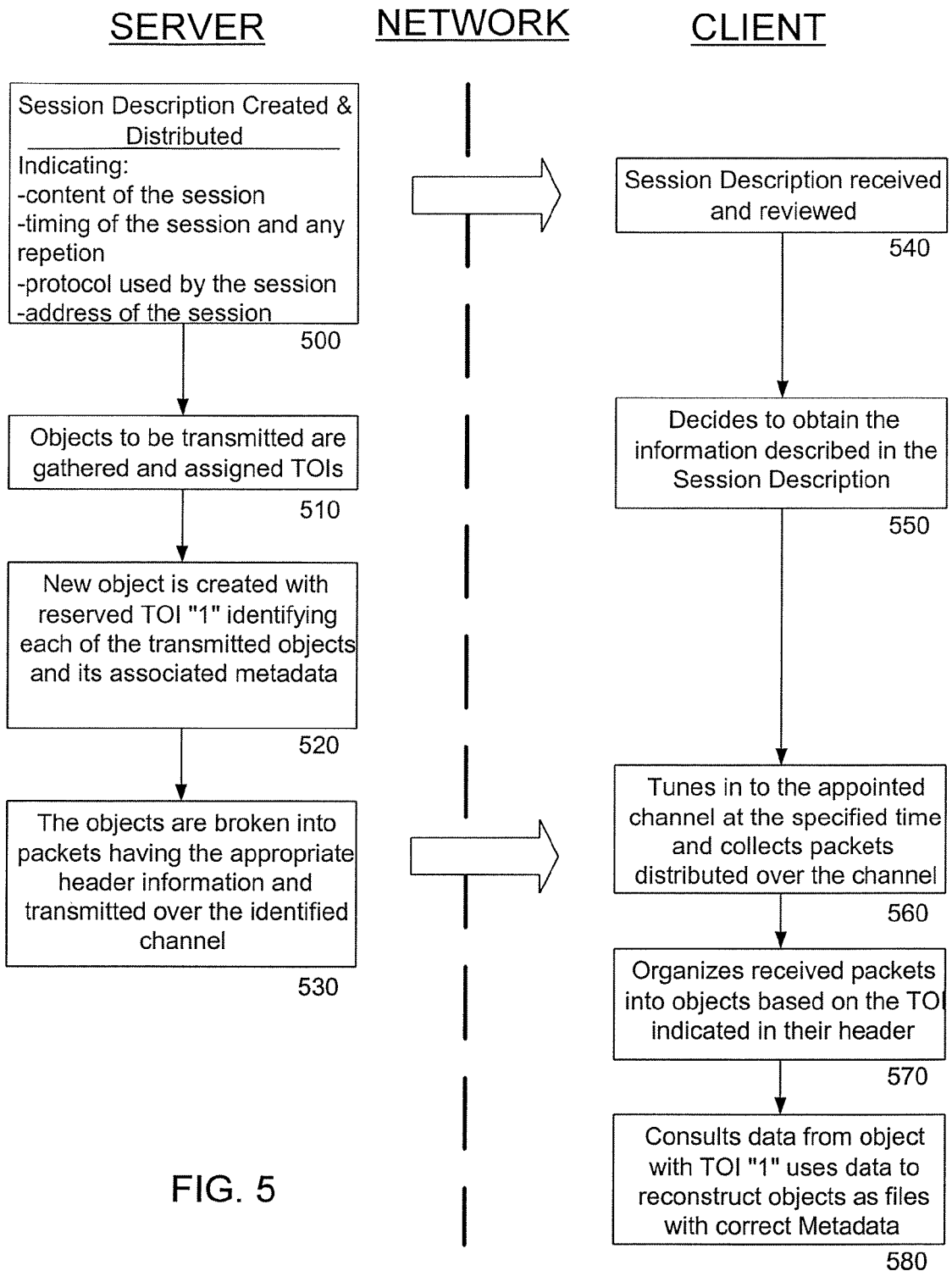
FIG. 5 is block diagram demonstrating the operation of an exemplary embodiment of the present invention.

The operation of system is demonstrated in FIG. 5. The left side of the figure demonstrates the operation of the device acting as the datacast server. The first step 500 is the creation of a session description, which comprises identification of the session's content, timing, location and TSI. The example shows the server carrying out this step and then transferring the session description over the network. In practice the session description does not have to come from the same source that ultimately distributes the datacast stream. It can be delivered from any location and by any method suitable for transmitting data, such as email, web, instant messaging, etc. One method is the use of the previously mentioned Session Description Protocol (SDP). Although the transmission of the session description is not part of the datacast itself, the expression of the parameters using existing description techniques is advantageous.

An exemplary File delivery session can be described using 'Media description' component of SDP as follows:
  Media type is 'application'
  Port number corresponds to the UDP port in which the file delivery session is to be transmitted.
  Transport protocol is 'ALC/LCT'
  Media format is '0'
  The IP address is either contained in the 'c=' field as a session level definition, or in the 'c=' field of the media description.
  Session level timing field 't=' defines the start and end time of the file delivery session. For repetition, field 'r=' MAY be used. * A special attribute 'a=TSI:' is used on the media level. This attribute contains the ALC/LCT Transport Session Identifier associated with the file delivery session.

The following example defines a file delivery session available from 2873397496 NTC to 2873404696 NTC. The delivery uses IPv6 multicast address ffe1::0010:1234:5678 and UDP port 12345. The TSI value for the session is 3.

```
v=0
o=user123 2890844526 2890842807 IN IP4 126.16.64.4
s=File delivery session example
i=More information
t=2873397496 2873404696
m=application 12345 ALC/LCT 0
c=IN IP6 ffe1::0010:1234:5678
a=TSI:3
```

In the next step 510 the server gathers the objects to be datacast and assigns them TOIs. These identifiers will be used to distinguish the different objects during the datacast.

In step 520, the FDT is created to identify each of the objects to be transmitted and defining their associated meta-data. The FDT as shown in FIG. 4 can consist of a simple text file listing each of objects to be sent in the datacast, their TOIs and their associated properties. In the alternative this data object could be coded in XML or any other data format readable by the client device.

Finally at step 530, the server breaks the objects into packets and distributes them according to the datacast time and channel identified in the session description. Each packet will be given an appropriate ALC header with the TSI and the associated TOI listed in the TOI field of the LCT header section.

The right side of FIG. 5 shows the client device operations needed to practice the present embodiment. The client device can be embodied by any computational device capable of carrying out the following steps; examples include personal computers, mobile phones, PDAs, etc. The first step 540 requires the client to be notified of the datacast. This is accomplished through the receipt and review of the session description.

After reviewing the session description, the client must decide whether or not to participate in the datacast, step 550. If the client decides to participate, the client device can be programmed to participate in the datacast at the scheduled time.

When the time of the datacast arrives, the client device tunes-in to the location identified by the session description and begins to collect packets, step 560. The client device examines each packet and reconstructs the delivered objects using their TOIs, step 570. The client device's examination includes a check of the TSI and TOI to decide if the packets shall be received and/or stored.

Once all of the packets for TOI 1 have been received the device can read the data carried in the object to recreate the meta-data for the remaining objects. The meta-data can then be used to recreate the received files in the client device's file system with all their appropriate file properties, step 580.

For example, a digital broadband receiver or cellular transceiver receives information of the scheduled program. An application processor in the receiver extracts schedule information and informs the receiver to be turned on when digital broadband transmission occurs. This could occur based on the selection of a user. During the session, the receiver receives content file information, via an FDT, and extracts at least the contained content size information. The client then either receives or refuses to receive the content file based on the amount of memory available to it.

Another exemplary embodiment of the present invention demonstrates the process for receiving files, as follows. The receiver obtains a description of the file delivery session identified by the source IP address, destination IP address, Transport Session Identifier. The receiver joins or otherwise attaches to the network to receive packets associated with the selected file delivery session. The receiver starts to receive packets around the indicated start time. The receiver receives ALC/LCT packets associated with the selected file delivery session. The receiver checks that the packets match the declared and selected Transport Session Identifier. If not, packets are silently discarded. While receiving, the receiver keeps the received packets in a buffer per each Transport Object Identifier to construct the object. Multiple objects can be constructed in parallel by having a corresponding number of buffers in the receiver. If the last segment of an object was received and the associated TOI was '1' the receiver has received a complete File Delivery Table. The receiver checks the FDT version. If a previous FDT does not exist, or if the version number of the previous FDT is less than the received, the received FDT becomes the current one. Otherwise the received FDT is silently discarded. If the last segment of an object was received and the associated TOI was other than '1,' the receiver has received a file. The receiver looks up the current FDT and assigns file properties described in the FDT. The receiver also checks that received content length matches the description in the FDT. Similarly, the receiver checks that the calculated MD5 matches with the description in the FDT. If the file delivery session end time has not been reached the receiver continues receiving. If the file delivery session end time has been reached, the receiver may leave the network.

A second exemplary implementation of the present invention will now be described. In this embodiment the individual data objects and the file description table are not sent as separate objects. Instead they are all combined as a single MIME-multipart archive.

As shown in FIG. 6, the delivered object 600 is an aggregation of multiple files. Note, FIG. 6 represents the complete object and not an individual packet, thus, no network header information is shown. The first element in the file is a MIME header 610 that indicates the MIME version used, the total length of the object, the type of object, e.g. multipart-related or multipart-mixed, and the identifying marker that divides one file from the next, divider 620, e.g. "example4321." The next element in the file is the divider 620 defined in the MIME header. This indicates that a new object is beginning. Next are the enclosed data objects 630, 635, separated by another divider 620. Each data object has its own MIME header providing meta-data for the object, this is completely analogous to the meta-data provided in the FDT of the previous embodiment. Immediately following the object header is the actual content of the object.

In operation, the individual files and would be combined into the single MIME multipart object prior to the datacast. This process would include the creation of the MIME-headers containing the appropriate meta-data. The server would break this file into packets and deliver it over the datacast session in the usual manner. Upon receipt, client device software would read the entire data object 600 and parse it into individual objects show1.mpg and show1.html. The software could then use the information in the MIME headers to add the appropriate meta-data to the objects and create files for use by the client device. The client device can then save the files into its file system like any other file.

The MIME embodiment is different than the FDT embodiment in a couple ways. First, the MIME embodiment does not require the use of TOIs or a FDT because all of the files are combined in one object. Thus, the key advantage of the MIME embodiment is that it is slightly less complicated to implement. Of course, nothing prohibits the transmission of multiple MIME-multipart objects in a single session, thereby, requiring TOIs to distinguish between them, but even in this case there is no the need for a FDT. The FDT embodiment, however, is more robust and allows a finer grain control over the data object transmission. For example, after receiving a complete FDT the client can determine which of the datacast files it wishes to obtain. Once it has collected these files it can leave the datacast session, even if other data continues to be transmitted.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

The invention claimed is:

1. An apparatus, comprising:
a processor; and
at least one memory including computer program code, the at least one memory and the computer program code configured to, with the processor, cause the apparatus at least to perform:
interpret a session description;
wherein, the session description comprises: a description of the datacast session's content; a description of the datacast session's timing; and a description of the datacast session's location;
determine to tune a network receiver to the datacast session based on the session description;
receive object packets transmitted over a network and having transmission object identifiers, wherein the object packets have headers identifying a session identifier;
determine to arrange the object packets into at least a first object and a second object based on the object packet's transmission object identifiers, wherein the first object contains a file delivery table, wherein the first object has a reserved transmission object identifier value, and wherein the transmission object identifier value is employed for all file delivery tables;
determine to extract meta-data from the first object pertaining to the second object as identified by its transmission object identifier; and
determine to store the second object in non-volatile memory as a file having one or more properties identified by the extracted meta-data.

2. The apparatus according to claim 1 wherein, at least one of the properties extracted from the meta-data is the object's size; and wherein, the second object is not stored if the second object's size is larger than available non-volatile memory.

3. A method, comprising:
interpreting a session description; wherein, the session description comprises: a description of the datacast session's content; a description of the datacast session's timing; and a description of the datacast session's location;
determining to tune a network receiver to the datacast session based on the session description;
receiving object packets transmitted over a network and having transmission object identifiers, wherein the object packets have headers identifying a session identifier;
determining to arrange the object packets into at least a first object and a second object based on the object packet's transmission object identifiers, wherein the first object contains a file delivery table, wherein the first object has a reserved transmission object identifier value, and wherein the transmission object identifier value is employed for all file delivery tables;
determining to extract meta-data from the first object pertaining to the second object as identified by its transmission object identifier; and
determining to store the second object in a non-volatile memory as a file having one or more properties identified by the extracted meta-data.

4. The method according to claim 3 wherein, at least one of the properties extracted from the meta-data is the object's size; and wherein, the second object is not stored if the second object's size is larger than available non-volatile memory.

5. The method according to claim 3 wherein, the file is stored in a location dictated by the extracted meta-data.

6. The method according to claim 3 wherein the meta-data includes a hash value and, further comprising, determining to refuse to store the file if a result of applying a hash function to the file does not match the hash value.

* * * * *